United States Patent
Jebbar et al.

(10) Patent No.: US 12,117,923 B2
(45) Date of Patent: Oct. 15, 2024

(54) REGRESSION TEST SUITE REDUCTION FOR CLOUD SYSTEMS

(71) Applicants: Telefonaktiebolaget LM Ericsson (publ), Stockholm (SE); Oussama Jebbar, Montreal (CA); Mohamed Aymen Saied, Lévis (CA); Ferhat Khendek, Montreal (CA); Maria Toeroe, Montreal (CA)

(72) Inventors: Oussama Jebbar, Montreal (CA); Mohamed Aymen Saied, Lévis (CA); Ferhat Khendek, Montreal (CA); Maria Toeroe, Montreal (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 153 days.

(21) Appl. No.: 17/638,850

(22) PCT Filed: Aug. 25, 2020

(86) PCT No.: PCT/IB2020/057945
§ 371 (c)(1),
(2) Date: Feb. 27, 2022

(87) PCT Pub. No.: WO2021/038448
PCT Pub. Date: Mar. 4, 2021

(65) Prior Publication Data
US 2022/0334952 A1    Oct. 20, 2022

Related U.S. Application Data

(60) Provisional application No. 62/893,475, filed on Aug. 29, 2019.

(51) Int. Cl.
G06F 11/36    (2006.01)

(52) U.S. Cl.
CPC ...... *G06F 11/3684* (2013.01); *G06F 11/3688* (2013.01)

(58) Field of Classification Search
CPC .................. G06F 11/3684; G06F 11/3688
See application file for complete search history.

(56) References Cited

U.S. PATENT DOCUMENTS

| 10,380,004 | B2 * | 8/2019 | Liemandt | G06F 11/3672 |
| 2014/0040867 | A1 * | 2/2014 | Wefers | G06F 11/3684 |
| | | | | 717/131 |

FOREIGN PATENT DOCUMENTS

WO    WO 2019234953 A1    12/2019

OTHER PUBLICATIONS

Animesh Chaturvedi, Change Impact Analysis Based Regression Testing of Web Services, 2014, retrieved online Sep. 23, 2023, pp. 31-73. Retrieved from the Internet: ,URL: https://arxiv.org/ftp/arxiv/papers/1408/1408.1600.pdf>. (Year: 2014).*

(Continued)

*Primary Examiner* — Hanh Thi-Minh Bui
(74) *Attorney, Agent, or Firm* — Sage Patent Group

(57) ABSTRACT

The disclosure relates to a method, system and computer readable media for validating that a configuration of a cloud system meets requirements, using a reduced test suite selected from a test suite. The method includes classifying the requirements and service instances realizing the requirements composing the cloud system. The method includes applying test suite reduction rules to the test suite, using the classified requirements and service instances, to obtain the reduced test suite. The method includes applying the reduced test suite to the cloud system configured with the configuration, thereby validating that the configuration of the cloud system meets the requirements.

16 Claims, 4 Drawing Sheets

(56) References Cited

OTHER PUBLICATIONS

S. Sotiriadis et al. "Unit and Integration Testing of Modular Cloud Services," 2017, IEEE 31st International Conference on Advanced Information Networking and Applications (AINA), Taipei, Taiwan, 2017, pp. 1116-1123, doi: 10.1109/AINA.2017.57. (Year: 2017).*
International Search Report and Written Opinion of the International Searching Authority, PCT/IB2020/057945, mailed Nov. 25, 2020, 11 pages.
Jebbar, O., et al., "Poster: Re-Testing Configured instances in the Production Environment—A Method For Reducing the Test Suite," 2019 12th IEEE Converence on Software Testing, Validation and Verification (ICST), Apr. 22, 2019 (XP033559289) 4 pages.

* cited by examiner

REGRESSION TEST SUITE REDUCTION FOR CLOUD SYSTEMS

CROSS REFERENCE TO RELATED APPLICATIONS

This application is a 35 U.S.C. § 371 national stage application of PCT International Application No. PCT/IB2020/057945 filed on Aug. 25, 2020, which in turn claims domestic priority to U.S. Provisional Patent Application No. 62/893,475, filed on Aug. 29, 2019, the disclosures and content of which are incorporated by reference herein in their entirety.

TECHNICAL FIELD

The present disclosure relates to regression test suite reduction for cloud systems.

BACKGROUND

Service providers offer a wide variety of services to meet their tenants' needs. The software commonly used to provide such services is configurable because configurability helps meeting (with the same software) different requirements for different tenants and for different environments. Customizing the software allows to meet the requirements, thus speeding up the time to market. Configurable software is customized into a configured instance through a configuration which meets specific tenant's requirements for a specific environment. From the software perspective a cloud system can be seen as a set of configured instances and the cloud configuration in this case consists of the set of configurations of the configured instances. Thus, in such systems these configurations are a significant source of faults and a cause of non-compliance with the tenants' requirements.

Cloud systems evolve and undergo frequent reconfigurations. Reconfigurations include additions/removals of configured instances, changes in the values of configuration parameters to fix a bug or fine tune the performance of a configured instance or of the system. One or more configured instances may be impacted by a reconfiguration, e.g. in a single reconfiguration the admin may change the values of configuration parameters for different configured instances. After each reconfiguration, the cloud system undergoes regression testing to check that the changes have the desired effects and do not cause undesired ones. The literature proposes several strategies for regression test case selection from the acceptance test suite. These selection strategies can be 1) based on impact analysis such as change based test case selection methods, 2) the operational profile such as test case prioritization, 3) test case minimization methods, or 4) none of the above, but rather retest all, i.e. apply all the test cases again.

In PCT/IB2019/054874 an approach was proposed to select test cases from the acceptance test suite to retest a configured instance after it is deployed in the production environment. This approach was based on the classification of configuration parameters, and it considered only two configured instances in isolation: the configuration used in the development environment and the one used in the production environment.

SUMMARY

In PCT/IB2019/054874, both configurations had the same values for all environment agnostic configuration parameters, and also assumed that both configured instances were used to satisfy the same set of requirements.

One issue is that the impact of a change performed on a given service can go beyond the changed service, especially in the cloud. Other services that either depend on the changed service or share resources with it can be impacted by the change as well, which is not considered in the existing methods. Another issue is that if the testing is carried out in the production environment, only the absolutely necessary test cases should be performed to minimize the impact of the testing on the normal traffic. This minimization is one of the motivations for the previously existing regression test selection strategies. However further reduction is possible.

The approach proposed in PCT/IB2019/054874 addressed the first issue, but had limited applicability due to the following assumptions: it considered only two configured instances in isolation and not the whole cloud system. It also assumed that the configuration used in the development environment and the one used in the production environment had the same values for all environment agnostic configuration parameters, as well as that both configured instances were used to satisfy the same set of requirements.

In this disclosure a method for reducing a regression test suite for cloud systems is provided. The method is based on a classification of configuration parameters into environment dependent and environment agnostic configuration parameters. Using this classification, the relationships between the configuration parameters and the requirements, the requirements and service instances and their applicable test cases, the test case that needs to be run after a reconfiguration to detect configuration faults is selected from an acceptance or regression test suite. The test case is then characterized and summarized in a configuration fault model.

There is provided a method for validating that a configuration of a cloud system meets requirements, using a reduced test suite selected from a test suite. The method comprises classifying the requirements and service instances realizing the requirements composing the cloud system. The method comprises applying test suite reduction rules to the test suite, using the classified requirements and service instances, to obtain the reduced test suite. The method comprises applying the reduced test suite to the cloud system configured with the configuration, thereby validating that the configuration of the cloud system meets the requirements.

There is provided a system for validating that a configuration of a cloud system meets requirements, using a reduced test suite selected from a test suite. The system comprises processing circuits and a memory, the memory containing instructions executable by the processing circuits whereby the system is operative to classify the requirements and service instances realizing the requirements composing the cloud system. The system is further operative to apply test suite reduction rules to the test suite, using the classified requirements and service instances, to obtain the reduced test suite. The system is further operative to apply the reduced test suite to the cloud system configured with the configuration, thereby validating that the configuration of the cloud system meets the requirements.

There is provided a non-transitory computer readable media having stored thereon instructions for validating that a configuration of a cloud system meets requirements, using a reduced test suite selected from a test suite. The instructions comprise classifying the requirements and service instances realizing the requirements composing the cloud system. The instructions comprise applying test suite reduction rules to the test suite, using the classified requirements and service instances, to obtain the reduced test suite. The instructions comprise applying the reduced test suite to the cloud system configured with the configuration, thereby validating that the configuration of the cloud system meets the requirements.

The method and system provided herein present improvements to the way cloud systems operate.

The method proposed herein reduces the size of the regression test suite while preserving the fault detection power according to a proposed fault model.

DETAILED DESCRIPTION

Various features will now be described with reference to the figures to fully convey the scope of the disclosure to those skilled in the art.

Many aspects will be described in terms of sequences of actions or functions. It should be recognized that according to some aspects, some functions or actions could be performed by specialized circuits, by program instructions being executed by one or more processors, or by a combination of both.

Further, computer readable carrier or carrier wave may contain an appropriate set of computer instructions that would cause a processor to carry out the techniques described herein.

The functions/actions described herein may occur out of the order noted in the sequence of actions or simultaneously. Furthermore, in some illustrations, some blocks, functions or actions may be optional and may or may not be executed; these are generally illustrated with dashed lines.

Configurable Systems and Configurations

Figure 1:
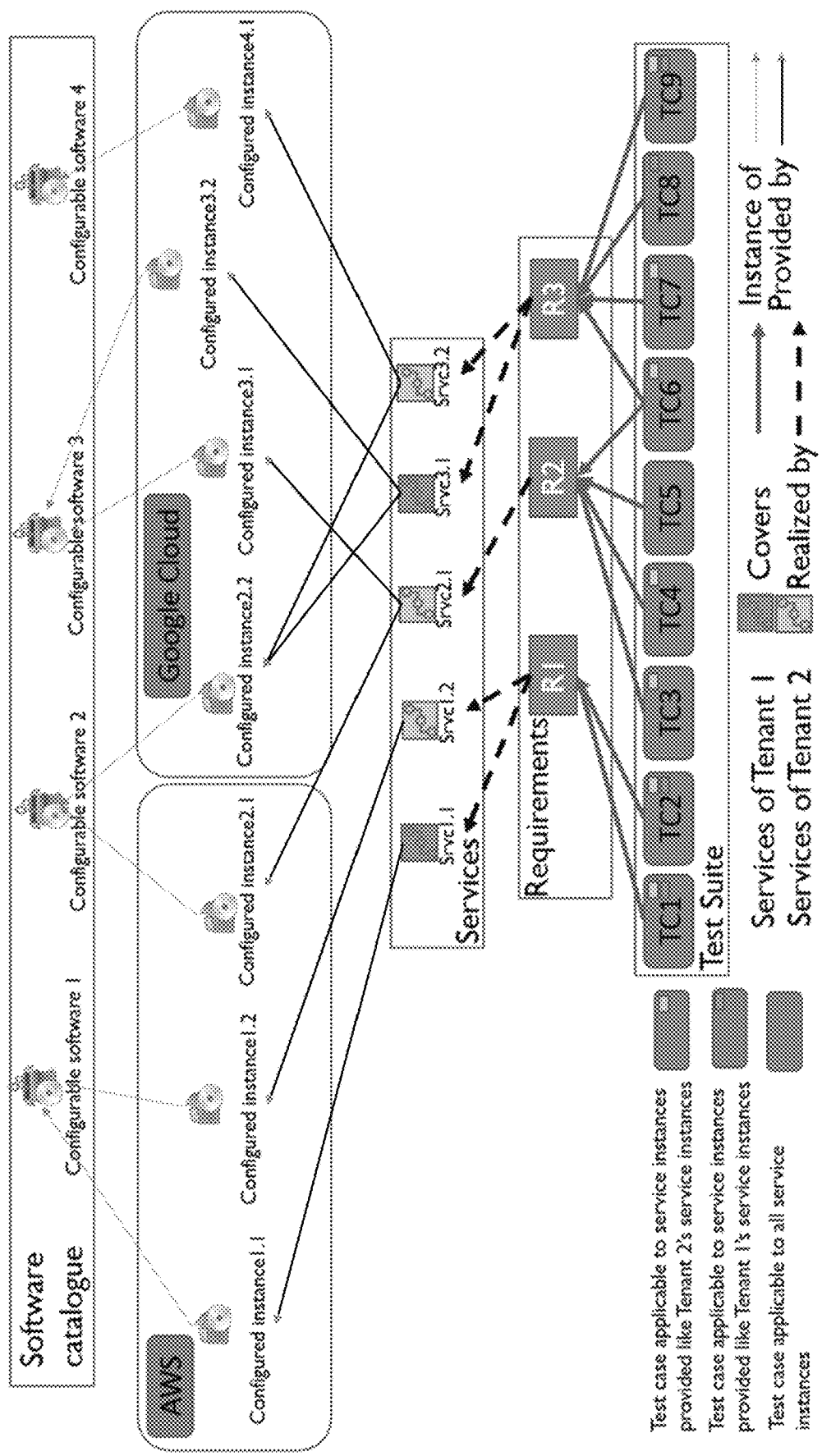
FIG. 1 is a schematic illustration of an example cloud system.

Referring to FIG. 1, to accommodate various tenants' requirements, service providers use configurable software. A configurable software is a software that cannot be used without a configuration. A configuration is a set of (key, value) pairs in which the keys represent parameters of the software's functions. These parameters have values, which do not change during the system's normal operation, e.g. while no bug is detected, or no new feature is requested. These parameters are referred to as configuration parameters.

When a new tenant requests a functionality (functional requirement) with certain characteristics (non-functional requirements), the service provider may create new configured instances (e.g. single tenancy architectures as Configured instance 1.1 and Configured instance 1.2 in FIG. 1.) to satisfy the new requirements or may use an already deployed configured instance (e.g. multi tenancy architectures as Configured instance 2.2 is shared between tenants in FIG. 1.). A configured instance is a system resulting from configuring a configurable software. A configured instance is used to satisfy a refined subset of the requirements (reflecting the purpose of the configured instance) towards the configurable software. Unlike the configurable software, a configured instance is ready for use. The set of configured instances that a service provider owns and manages composes the cloud system of that service provider.

Tenants may have the same or different requirements. A tenant requirement is realized using a service instance. To meet each tenant requirement, the cloud system realizes a service instance, resulting in as many service instances as there are tenant requirements (e.g. in FIG. 1. R1 is realized by Srvc1.1 for tenant 1 and by Srvc1.2 for tenant 2), i.e. one service instance per requirement per tenant. To provide a service instance, the service provider may use one (e.g. Srvc1.1 of FIG. 1.) or more configured instances (e.g. Srvc2.1 of FIG. 1.). Moreover, service instances that realize the same requirements for different tenants, may or may not be provided using configured instances of the same configurable software. In other words, a tenant may have his service instance for requirement R provided using a configured instance of configurable software CS1, while another tenant has his service instance, which realizes the same requirement R using a configured instance of configurable software CS2 (Requirement R3 of FIG. 1. for instance).

In addition to sharing configured instances, tenants may also share deployment environments (e.g. service instances of different tenants deployed in the same clouds, same datacenters, or same machines). With respect to a single tenant, a tenant may have his service instances deployed in the same or in different environments.

A configuration is used to realize the refined subset of the requirements of the configurable software that the configured instance is supposed to satisfy. Depending on the architecture of the configurable software, one may need more than one configuration to realize the requirements.

In a single tenant architecture, the application configuration is used to realize the requirements of the tenant. In a multi-tenant architecture, one configured instance may be shared between multiple tenants. Therefore, an application configuration is processed by the configured instance and is shared between all the tenants that are using this instance; and, a tenant configuration is managed by the configured instance and is specific to each tenant.

Table 1, further below, illustrates various requirement refinements for an e-commerce application and the configuration settings to satisfy these requirements. In the first case (activation/deactivation), the configuration controls the presence/absence of features of the configurable software in the configured instance. The second (refinement of a function) and third (refinement of an interaction) cases are concretizations of generic features of the configurable software. The last case (refinement of accessibility) covers access to the services exposed by the configured instance, or the service that the configured instance may need to be able to provide its services properly.

The settings in a configuration may be straightforward (e.g. the function refinement in the second case of Table 1 or it may rely on the expertise of a configuration designer to properly map the requirement to the configuration (e.g. refinement of an interaction with the environment as in the third case). Restarting the configured instances is often required to put application configurations into effect. The same does not usually apply to tenant configurations as they need to change dynamically.

A configuration can also be a deployment configuration managed by a third-party software for other purposes such as load balancing (High Availability (HA) Proxy), traffic routing (Ingress), failover (Kubernetes), etc. This type of configuration is also often dynamic, i.e. it can be changed without a restart of the software itself or the third-party software processing it.

The different configurations (tenant, application, and deployment configurations) yield different configured instances even if the same software is used to realize the different requirements.

Configurations undergo changes for different reasons such as to maintain an existing requirement, which has already been satisfied, or to satisfy a new requirement. Since a service instance is provided using one (e.g. Srvc 1.1 in FIG. 1.) or more (e.g. Srvc 3.1 in FIG. 1.) configured instances, the service instance may be associated with different configurations for the different configured instances involved in its provisioning. A service instance provided using two configured instances, for example, can be associated with an application configuration and have a tenant configuration for the first configured instance, and be associated with an application configuration and a deployment configuration for the second configured instance. These configured instances are then put together to provide the service instance. In this disclosure, a service instance is said to be "reconfigured" when a change in any of the configurations is involved in its provisioning. In addition, two service instances are provided the same way—they are alike—if the set of configurable software that were used to create the configured instances involved in the provisioning of these two service instances is the same.

To ensure compliance with the requirements of the service instances, service providers also design test cases to perform acceptance tests on their cloud systems.

The test cases in the acceptance test suite cover all the requirements that should be fulfilled by the cloud system. A given test case that covers a given requirement may or may not be applicable to all the service instances that realize this requirement. In fact, since service instances that realize the same requirement can be provided using configured instances of different configurable software, the service provider may have different test cases that cover the requirement depending on the configurable software of the configured instances involved in the provisioning of the service instances realizing this requirement.

As shown in FIG. 1 a test case may be applicable to a service instance only if provided using configured instances of specific configurable software (e.g. in FIG. 1. TC7 and TC8). A test case may also be applicable to all service instances realizing a requirement that the test case covers, such as TC5 in FIG. 1. Such test cases may be test cases used to ensure the compliance of the behavior or interface of the service instance to a given standard. A test case may cover one or many requirements. TC1 for instance covers one requirement R1, and TC6 covers multiple requirements R2 and R3.

After a reconfiguration, the system administrator needs to perform regression tests to evaluate the compliance of the system (under the new configuration) to its requirements. Typically, the regression test suite is a subset of the acceptance test suite that is used to validate the cloud system. Selecting the regression test cases can be done using different strategies:

Retest all: in this case all the test cases in the acceptance test suite will be in the regression test suite.

Change based test case selection: in this case only impacted configured instances will be subject to tests. Several impact analysis methods were proposed in the literature.

Test case prioritization: in this case the whole acceptance test suite is considered, and the test cases are executed in the order of their priority. The execution continues as long as the resources allow it. Resources can be time (test window), hardware/virtual resources, cost, etc. The subset of test cases that will be executed depends on the priority and the resources available for the regression test.

Test case minimization: in this case the same subset of test cases is used after each reconfiguration.

Configuration Parameters Classification

A configured instance realizes a refined subset of the requirements of a configurable software. Therefore, one can notice similarities between configurations of configured instances that realize the same requirements. These similarities stem from the fact that to realize a specific requirement, certain functionalities of the configurable system need to be refined in certain ways. The differences between configurations in this case are a result of deployments in different environments (operating system (OS), libraries, network, etc.) on the one hand, and, on the other hand, different deployment environments can have different types/amounts of resources that can be allocated to the configured

TABLE 1

Examples of refinement of configurable software's requirements and their manifestation in the configuration.

| | Requirement on the configurable software | Requirement on a configured instance | Manifestation in the configuration |
|---|---|---|---|
| Activation/ deactivation | Payment per credit card is an optional feature in the configurable system. | An e-commerce application that allows payment per credit card. | A Boolean configuration parameter set to "true" or "1" (e.g. cc_payment = true). |
| Refinement of a function | The number of items per cart should not exceed a pre-set number. | An e-commerce application that allows for up to 10 items per cart. | An integer configuration parameter set to 10 (e.g. max_item_per_cart = 10). |
| Refinement of an interaction | The duration for which the system waits for confirmation of a monetary transaction should not exceed a pre-set number. | An e-commerce application for which the processing of the payment should not exceed 1 minute. | An integer configuration parameter set to a duration in a time unit (e.g. if time unit is seconds, the configuration parameter can be set as follows: transaction_timeout = 60). |
| Refinement of accessibility | The credit card payment if activated should be accessible using TCP through a pre-set port. | An e-commerce application that allows payment per credit card. | An integer configuration parameter holding the port number (e.g. cc_service_port = 1025) | instance. Taking these aspects in consideration, in previous work the following classification for configuration parameters were proposed:

Environment agnostic configuration parameter: a configuration parameter which is independent from the environment of the configured instance. In other words, to satisfy a requirement the value of this parameter can be set independently from the environment where the configured instance is deployed. Typically, it has the same value (this can also be a range of values) for all configured instances that satisfy the requirement in question.

Environment dependent configuration parameter: a configuration parameter for which the value, to satisfy a requirement, depends on the environment of the configured instance.

Regression Test Suite Reduction Method

Fault Model

Configuration designers may make various types of errors or faults. Misconfigurations for instance are the type of faults which are addressed the most in the literature. Misconfigurations happen when the configuration designer sets a configuration parameter to a value that makes the resulting configuration invalid. In other words, the value of the configuration parameter does not match the type or the format it should; or it violates a constraint with the values of other configuration parameters. Misconfigurations manifest differently at runtime depending on the configurable software in question, they can manifest as crashing errors (when the configuration parameter causes the configured instance to crash), they can also lead to a configured instance that cannot be instantiated at all (e.g. if a configurable software validates the configuration at instantiation time). Herein it is assumed that the configuration is valid. The following question is also addressed: Is the right configurations used to meet the requirements? To the best of our knowledge, none of the previous work addresses this kind of errors. Therefore, a fault model is proposed to classify the different mistakes a configuration designer may make which can lead to a violation of one or more requirements.

In a cloud system, configured instances may interact with one another and share resources to realize the requirements. The configurations play an important role in setting these interactions and resource sharing. Moreover, configurations may also specify the behaviors the configured instances exhibit at runtime. As a result, the wrong configuration may lead to violations of the requirements caused by wrong interactions, flawed resource sharing, or badly parametrized behaviors. Therefore, the following types of configuration faults are proposed:

Hooking fault: a hooking fault occurs when a configured instance is set to interact with: 1) the wrong client, which can be internal or external; or 2) the wrong resource, which can be physical, virtual or logical resource such as another configured instance. This kind of faults may occur at the level of the deployment configuration or at the level of the application configuration. Examples of such faults include: a configured instance is set to request a service instance from another configured instance, but the second configured instance does not expose that service instance, or a configured instance that is set to write to a folder to which it does not have permissions, etc.

Grouping/sharing fault: a grouping/sharing fault occurs when multiple configured instances are wrongly set to use the same resource or to be treated the same way under certain circumstances. Examples of such faults include: two configured instances that expose service instances on the same port are hosted on the same node, or multiple configured instances with largely different scaling requirements are set to scale at the same pace, etc.

Dimensioning fault: a dimensioning fault occurs when a configured instance, for example, is not "big enough" for its purpose, i.e. does not run enough processes to meet its functional and non-functional requirements. This kind of faults can occur at the level of the deployment configuration. Examples of such faults include: not enough processes to handle the maximum load, not enough processes to handle the maximum number of concurrent sessions, not enough redundancy to meet the availability requirement, too many underutilized instances, etc.

Behavior setting fault: a behavior setting fault occurs when a behavior is falsely activated, deactivated, or refined. This kind of faults can occur at the level of both application and deployment configurations. Examples of such faults include: setting a timeout in such a way that a non-functional requirement may be violated, setting a parameter of a function in such a way that a functional requirement may be violated, such as setting the maximum withdrawal limit to a wrong value in a banking application.

Input Artifacts

The method takes as input the following artifacts:

a) The configuration of the cloud system: it is composed of the configurations of all the configured instances that compose the cloud system. These configurations are sets of key-value pairs. The configuration parameters are identified in a configuration as IdOfInstance-IdOfProduct-NameOfParam (e.g. configuredInstance1.1-configurableSoftware1-confParam1, configuredInstance1.1-configurableSoftware1-confParam2, configuredInstance1.2-configurableSoftware1-confParam1).

b) The classification of configuration parameters: it classifies the configurations parameters in the system as environment agnostic or environment dependent. In the classification the configuration parameters are referenced as IdOfProduct-NameOfParam (e.g. configurableSoftware1-confParam1, configurableSoftware 1-confParam2, configurableSoftware2-confPram1). Thus, the class of a configuration parameter can be found by removing the instance Id from the Id of the configuration parameter in the configuration and finding in the classification the class associated with the remaining sequence. For instance, to find the class of the configuration parameter configuredInstance1.1-configurableSoftware1-confParam1, the class of configurableSoftware1-confParam1 in the configuration parameters' classification is looked up.

c) The impact matrix of the cloud system: it maps every requirement that is realized by the cloud system to the configuration parameters (of specific configured instances) that are related to it. In this matrix the configuration parameters are identified according to (a), i.e. as they are in the cloud system configuration.

d) The regression test suite: it is the set of test cases selected for regression testing. These test cases can be selected using a regression test case selection method; for example, if the administrator has a set of potentially impacted requirements after an impact analysis, the test suite will be composed of all the test cases that cover at least one of the impacted requirements.

e) The requirement-service matrix: it maps every requirement to the service instances used to realize the requirement.
f) The applicability matrix: it maps every test case in the acceptance test suite to the service instances to which it is applicable.
g) The change: it is the set of changes that were made to the configuration. This includes the list of configured instances that were newly instantiated, terminated, or reconfigured by changes in configuration parameters values, software updates, etc.; the configuration parameters are identified according to (a).
h) Test case runs history: it captures the relevant information of successful test case runs. In other words, it consists of triplets of: 1) a test case; 2) a requirement this test case covers; and 3) the values of the configuration parameters that were used to test this requirement in the test case run. The configuration parameters in this artifact are identified according to (b). In a fully automated environment, this artifact would be updated after every test session, i.e. entries associated with new successful test runs would be added.

Classification of Requirements and Service Instances

From the relationships between the requirements and the configuration parameters (c), and the classification of configuration parameters (b), the requirements are classified such that:
  Environment agnostic requirements: they map to environment agnostic configuration parameters only, if any.
  Environment dependent requirements: they map to environment dependent configuration parameters only, and they are about system interfaces for interacting with the environment.
  Composite requirements: they map to environment agnostic as well as environment dependent configuration parameters.

To classify further the requirements based on how they are impacted by a change (g), first, the service instances realizing the requirements are classified.

The applicability matrix (f) maps the test cases to the service instances to which they are applicable, and the requirement-service matrix (e) maps every requirement to the service instances realizing it. Using this information, a service instance can be put in one of the following three categories:
  A service instance directly impacted by the change: a service instance which was reconfigured; and, to which at least one regression test case is applicable.
  A service instance indirectly impacted by the change: a service instance which was not reconfigured; and, to which at least one regression test case is applicable.
  A service instance not impacted by the change: a service instance which was not reconfigured; and, to which no regression test case is applicable.

Based on the classification of the service instances, the requirements can be classified from the perspective of the impact as follows:
  Directly impacted requirements: requirements that are realized by at least one directly impacted service instance.
  Indirectly impacted requirements: requirements that are not realized by any directly impacted service instances and that are realized by at least one indirectly impacted service instance.
  Unimpacted requirements: requirements that are realized only by service instances that are not impacted by the change.

Test Suite Reduction Rules

After classifying the requirements, the applicability matrix is reduced according to the following rules:
  Rule #1: For a requirement which is not impacted by the change (i.e. unimpacted requirement), all the service instances realizing it are removed from the applicability matrix.
  Rule #2: For each test case (TC) that covers a requirement (R), remove the applicability link between a service instance (S), which realizes R, and TC if:
    a. R is directly or indirectly impacted, environment dependent, and there is an entry in the history (h) consisting of TC, R, and a set of configuration parameters identical to the set of configuration parameters that are owned/associated with S and that impact R. Or
    b. R is directly impacted, environment agnostic, and there is an entry in history (h) consisting of TC, R, and a configuration (set of configuration parameters and their values) identical to the configuration owned/associated with S and that impact R.

After applying these two rules to reduce the applicability matrix, the following rules are applied to try to reduce it further before selecting the final set of test cases:
  Rule #3: Remove any service instance with no applicable test cases after applying the first two rules, and which realizes environment agnostic requirements.
  Rule #4: Remove any service instance from the applicability matrix if it realizes an environment dependent requirement and if:
    a. After applying the first two rules, it has no applicable test cases; and
    b. The service instance shares configuration parameters with another service instance that realizes a composite requirement (that is directly or indirectly impacted by the change). These configuration parameters impact both requirements, i.e. the environment dependent requirement and the composite requirement.
  Rule #5: If a service instance realizes an environment dependent requirement and Rule #4 does not apply to it, it gets its applicability links back.

Finally, select all test cases that apply to at least one service instance left in the applicability matrix. The selected test cases will have to be run on each service instance to which they apply in the reduced applicability matrix (not the original).

Figure 2:
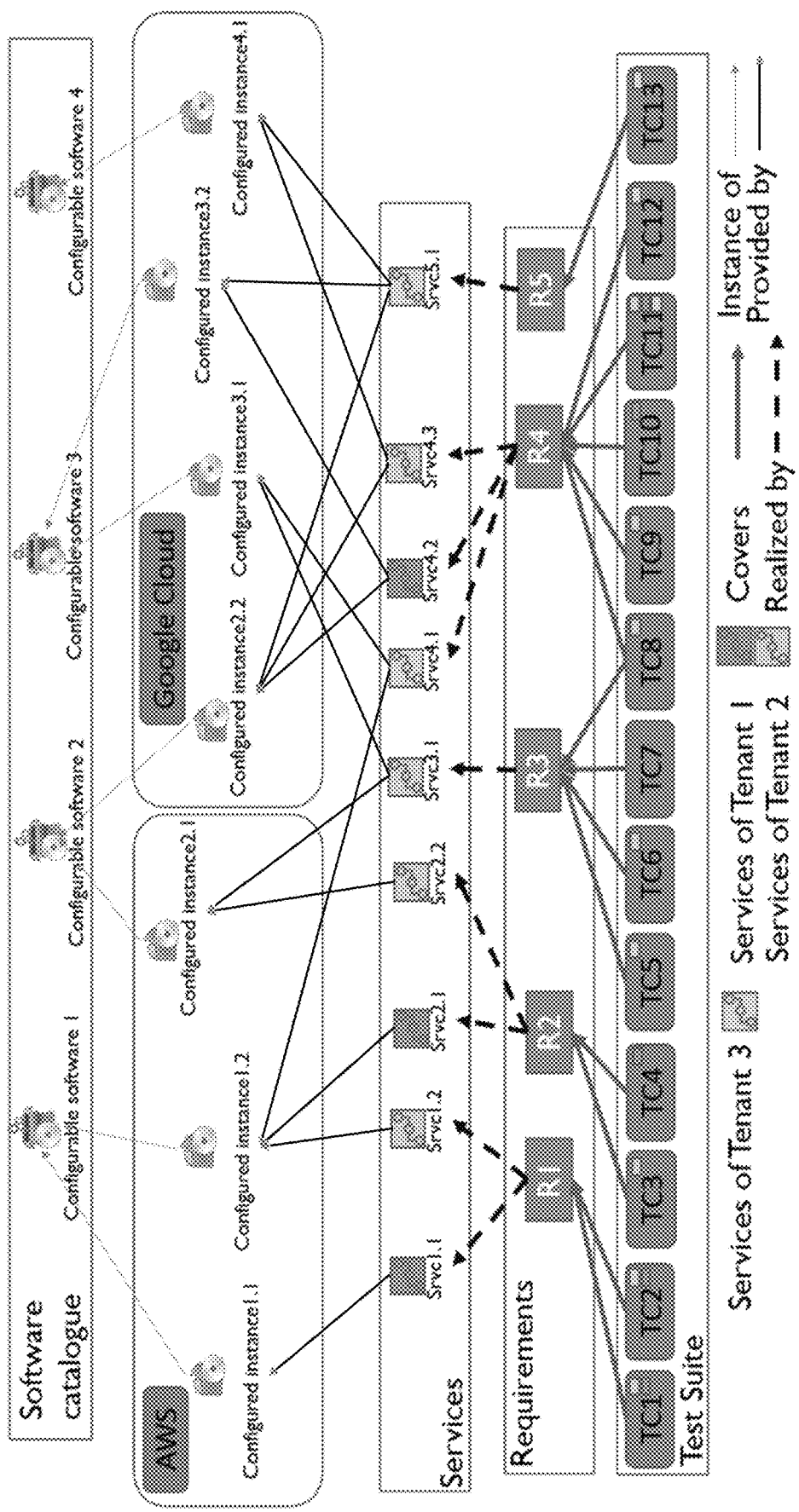
FIG. 2 is a schematic illustration of another example cloud system.

The system shown in FIG. 2 (as system configuration input (a)) will be used to illustrate this approach.

Table 2 represents the applicability matrix (input (f)) that maps each test case to the service instances to which it applies. Table 3 represents the requirement-service matrix (input (e)) associated with this system.

TABLE 2

Applicability matrix of the acceptance test suite in FIG. 2.

|         | TC1 | TC2 | TC3 | TC4 | TC5 | TC6 | TC7 | TC8 | TC9 | TC10 | TC11 | TC12 | TC13 |
|---------|-----|-----|-----|-----|-----|-----|-----|-----|-----|------|------|------|------|
| Srvc1.1 | X   | X   |     |     |     |     |     |     |     |      |      |      |      |
| Srvc1.2 | X   | X   |     |     |     |     |     |     |     |      |      |      |      |
| Srvc2.1 |     |     |     | X   |     |     |     |     |     |      |      |      |      |
| Srvc2.2 |     |     | X   |     |     |     |     |     |     |      |      |      |      |
| Srvc3.1 |     |     |     |     | X   | X   | X   | X   |     |      |      |      |      |
| Srvc4.1 |     |     |     |     |     |     |     |     |     |      | X    | X    |      |
| Srvc4.2 |     |     |     |     |     |     |     |     |     | X    | X    |      |      |
| Srvc4.3 |     |     |     |     |     |     |     | X   | X   |      | X    |      |      |
| Srcv5.1 |     |     |     |     |     |     |     |     |     |      |      |      | X    |

TABLE 3

Requirement-service matrix of the system in FIG. 2.

|    | Srvc1.1 | Srvc1.2 | Srvc2.1 | Srvc2.2 | Srvc3.1 | Srvc4.1 | Srvc4.2 | Srvc4.3 | Srvc5.1 |
|----|---------|---------|---------|---------|---------|---------|---------|---------|---------|
| R1 | X       | X       |         |         |         |         |         |         |         |
| R2 |         |         | X       | X       |         |         |         |         |         |
| R3 |         |         |         |         | X       |         |         |         |         |
| R4 |         |         |         |         |         | X       | X       | X       |         |
| R5 |         |         |         |         |         |         |         |         | X       |

For illustration purpose the following scenario is used:

Configured instance 1.1 and Configured instance 2.2 were reconfigured (input (g)).

The regression test case selection method used by the administrator consists of selecting tests cases that cover at least one requirement realized using a service instance which was reconfigured; and, run these test cases on all the service instances that realize the requirement and to which they are applicable.

Requirement R1 is environment agnostic, R5 and R3 are composite requirements, and R4 is an environment dependent requirement (input (b)).

After the reconfiguration of Configured instance 1.1, configurations owned-by/associated with Srvc1.1 and Srvc1.2 have the same values for configuration parameters that impact R1; and, TC1 and TC2 already passed for Srvc1.2 under its current configuration (relevant part of the history input (h)).

Srvc4.3 and Srvc5.1 share configuration parameters which impact R4 and R5 respectively (summary of impact matrix, input (c)).

For this scenario, the regression test suite will be composed of {TC1, TC2, TC8, TC9, TC10, TC11, TC12, TC13} (input (d)). Moreover, since the administrator runs the tests on each service instance to which they apply, the total number of runs would be 12 runs.

Taking into consideration this regression test suite, the service instances can be classified as follows:

Srcv1.1, Srcv4.2, Srvc4.3, and Srvc5.1 are directly impacted by the change.

Srvc1.2, Srvc4.1, and Srvc3.1 are indirectly impacted by the change.

The rest of the service instances are unimpacted by the change.

Using this classification, the requirements are classified as follows:

R1, R4, and R5 are directly impacted by the change.

R3 is indirectly impacted by the change.

R2 is not impacted by the change.

Applying Rule #1, R2 will be removed from the requirement-service matrix. Applying Rule #2 on R1, no test case will be applicable on Srvc1.1 and Srvc1.2. Applying Rule #2 on R4, no tests case will be applicable on Srvc4.1, Srvc4.2, and Srvc4.3. R5 will remain as is since it is a composite requirement.

Rule #3 applies to Srvc1.1 and Srvc1.2, these two service instances will be removed from the applicability matrix.

Rule #4 applies to Srvc4.3, as a result this service instance will be removed from the applicability matrix.

Rule #5 will lead to Srvc4.2 and Srvc4.1 getting their applicability links back.

Finally, Srvc2.1 and Srvc2.2 will be removed from the applicability matrix as R2 was removed previously from the requirement-service matrix as a result of applying Rule #1.

The resulting reduced test suite will be composed of {TC8, TC10, TC11, TC12, TC13}, applicable only to Srvc5.1, Srvc3.1, Srvc4.1, and Srvc4.2. As a result, the total number of runs or tests to be performed is reduced to 6.

Semi-Formal Proof

As a first step, as shown in Table 4, the link between the classes of requirements and the kinds of faults that can cause their violations is established. The simplest case is the environment agnostic requirements as their violation can only be caused by a behavior setting fault (specifically a setting fault of an environment agnostic configuration parameter). This stems from the fact that the other three types of faults involve environment dependent configuration parameters and therefore can impact either environment dependent or composite requirements. Environment dependent requirements are by definition impacted by environment dependent configuration parameters only, and are about the system interfaces for interacting with the environment; therefore, their violations can only be caused by a grouping/sharing fault or a hooking fault. Finally, violations of composite requirements can be caused by a fault of any of the above kinds. Moreover, a behavior setting fault that causes a violation of a composite requirement may involve environment agnostic as well as environment dependent configuration parameters.

TABLE 4

Classes of requirements and types of faults that may cause their violation.

| | Environment dependent requirement | Environment agnostic requirement | Composite requirement |
|---|---|---|---|
| Hooking fault | X | | X |
| Grouping/sharing fault | X | | X |
| Dimensioning fault | | | X |
| Behavior setting fault | | X | X |

If the original regression test suite can detect a configuration fault, the reduced test suite should be able to detect it too. To prove this, the assumption (Assumption #1) is made that hooking and grouping/sharing faults due to a given configuration parameter will manifest at the level of all the requirements impacted by this configuration parameter, i.e. for each one of these requirements at least one test case covering it will fail.

The different configuration faults are considered.

Case 1: Dimensioning Faults

Dimensioning faults can only violate composite requirements. The original regression test suite and the reduced test suite contain the same set of test cases for covering composite requirements. Therefore, they can detect the same set of dimensioning faults.

Case 2: Behavior Setting Faults

Behavior setting faults can violate composite requirements and environment agnostic requirements.

Using the same reasoning as for the previous case, it can be concluded that the reduced regression test suite and the original regression test suite can detect the same set of setting faults that may jeopardize composite requirements.

Environment agnostic requirements are requirements that are only impacted by environment agnostic configuration parameters. Therefore, if a test case which covers an environment agnostic requirement passes for a service instance S which realizes this requirement and which is provided using a configured instance of a configurable system (CS), the test case will also pass for all service instances to which the test case is applicable and which realize this requirement and are provided using configured instances of CS using the same values of the configuration parameters that impact that environment agnostic requirement. As a result, behavior setting faults which may violate an environment agnostic requirement can only be detected using test cases which were never used to validate a service instance which realizes the same requirement and is provided using the same configuration. Such a test case can either be a newly added test case, or a test case which was never selected for regression testing; i.e. when the service instance has been provided using the current values of the configuration parameters that impact the requirement. This could be the case as some regression test case selection methods select different regression test suites on each run depending on the change. These test cases, according to the reduction rules, remain in the reduced test suite as their applicability links to the service instances are never removed, because their entries in the runs history (h) do not satisfy the conditions of Rule #2. Therefore, the reduced test suite and the original test suite can detect the same behavior setting faults that may jeopardize environment agnostic requirements.

Case 3: Hooking Faults and Grouping/Sharing Faults.

Hooking faults and grouping/sharing faults may violate both composite requirements and environment dependent requirements. Since the reduced test suite and the original test suite use the same set of test cases to cover the composite requirements, the reduced test suite will be able to detect hooking and grouping/sharing faults that can be detected by the original test suite and that may jeopardize composite requirements. Using Assumption #1, and the fact that the test cases that were not used before are kept for another configured instance realizing the same requirement, it can be deducted that the reduced test suite and the original test suite can detect the same faults that may jeopardize environment dependent requirements. In fact, evaluating the compliance of the system to an environment dependent requirement is only a matter of ensuring that the interactions with the environment are done properly.

Figure 3:
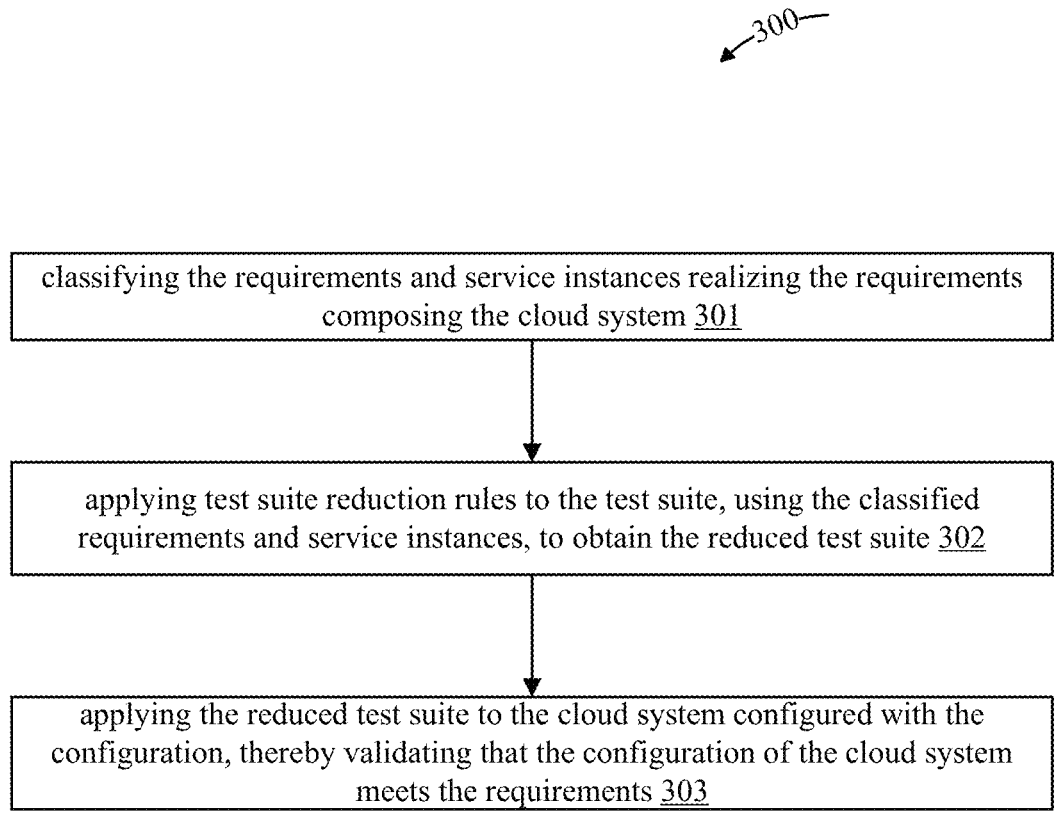
FIG. 3 is a flowchart of a method for validating a configuration of a cloud system.

FIG. 3 illustrates a method 300 for validating that a configuration of a cloud system meets requirements, using a reduced test suite selected from a test suite, the method comprising:

classifying, step 301, the requirements and service instances realizing the requirements composing the cloud system;

applying, step 302, test suite reduction rules to the test suite, using the classified requirements and service instances, to obtain the reduced test suite; and applying, step 303, the reduced test suite to the cloud system configured with the configuration, thereby validating that the configuration of the cloud system meets the requirements.

In the method, the step of classifying the requirements further comprises classifying the requirements among: environment agnostic requirements, environment dependent requirements and composite requirements, wherein classifying the requirements comprises classifying configuration parameters as environment agnostic or environment dependent configurations parameters and mapping every requirement that is realized by the cloud system to a configuration parameter to which it is related.

In the method, the step of classifying the service instances further comprises classifying the service instances among: a service instance directly impacted by a change, a service instance indirectly impacted by the change and a service instance not impacted by the change, wherein classifying the service instance is done using an applicability matrix which maps test cases to service instances to which the test cases are applicable and using a requirement-service matrix which maps every requirement to the service instances realizing the requirement.

In the method, the step of classifying the requirements further comprises classifying the requirements among: directly impacted requirements, indirectly impacted requirements, and unimpacted requirements based on the classification of the service instances.

In the method, the step of applying test suite reduction rules further comprises reducing the applicability matrix by:

removing all the service instances realizing a requirement which are not impacted by the change; and removing an applicability link between the service instance and a test case which realizes a requirement if:
the requirement is directly or indirectly impacted, the requirement is environment dependent, and there is an entry in a history consisting of a test case, a requirement, and a set of configuration parameters identical to the set of configuration parameters that are associated with the service instance and that impacts the requirement; or the requirement is directly impacted, the requirement is environment agnostic, and there is an entry in the history consisting of test case, a requirement, and a set of configuration parameters identical to the configuration parameters that are associated with the service instance and that impacts the requirement.

In the method, the step of applying test suite reduction rules further comprises reducing the applicability matrix by:

removing any service instance with no applicable test cases, and which realizes environment agnostic requirements;

removing any service instance if the service instance realizes an environment dependent requirement and if:
a. the service instances has no applicable test cases; and
b. the service instance shares configuration parameters with another service instance that realizes a composite requirement; and setting back applicability links if a service instance realizes an environment dependent requirement but conditions a. and b. are not realized.

Figure 4:
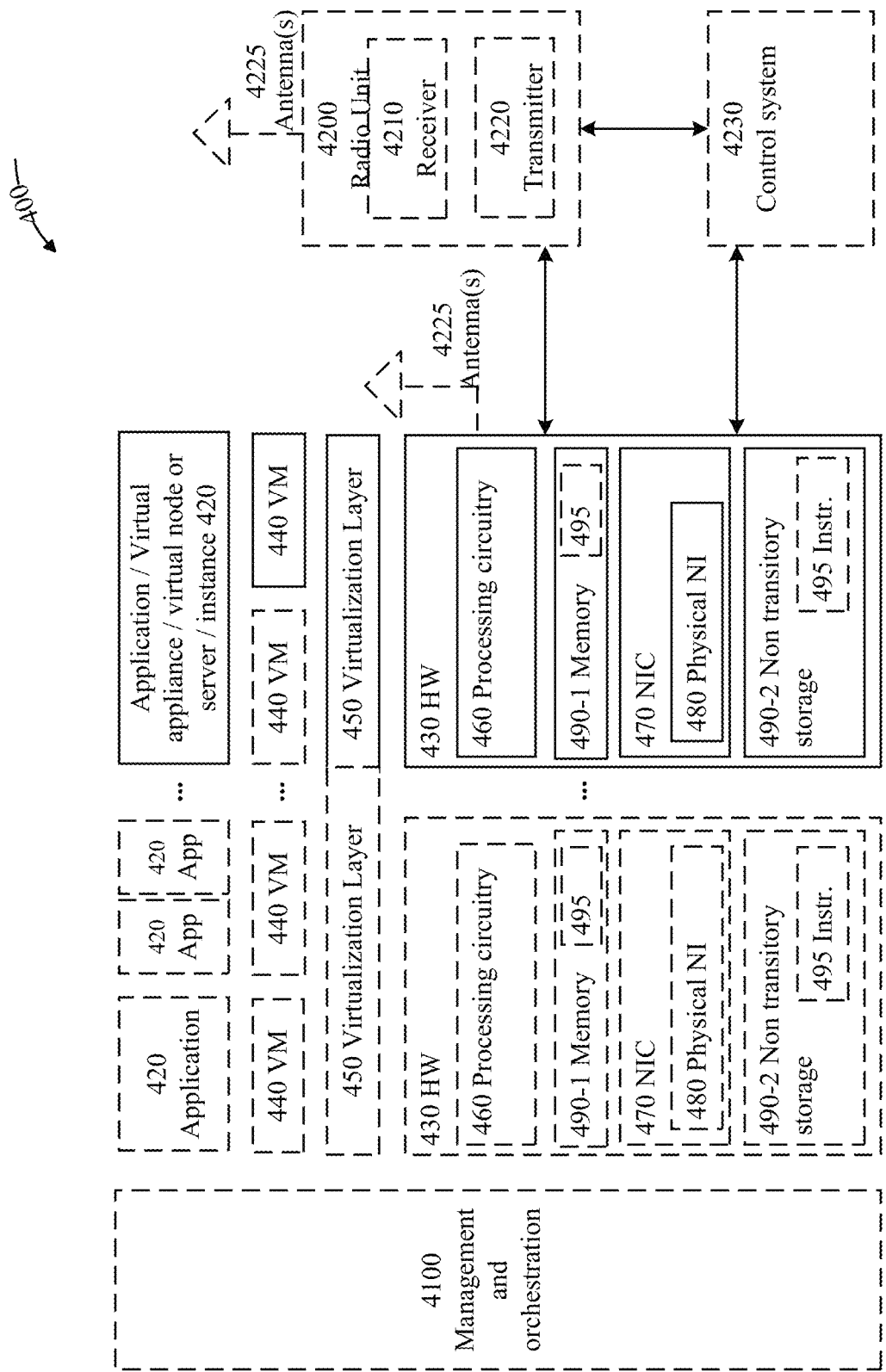
FIG. 4 is a schematic illustration of an example virtualization environment.

FIG. 4 is a schematic block diagram illustrating a virtualization environment 400 in which some functions may be virtualized. As used herein, virtualization can be applied to a node (e.g., a network node, a virtualized base station or a virtualized radio access node) or to a device (e.g., a UE, a wireless device or any other type of communication device) and relates to an implementation in which at least a portion of the functionality is implemented as one or more virtual components (e.g., via one or more applications, components, functions, virtual machines or containers executing on one or more physical processing nodes in one or more networks).

Some or all of the functions described herein may be implemented as virtual components executed by one or more virtual machines or containers implemented in one or more virtual environments 400 hosted by one or more of hardware nodes 430. Further, when the virtual node is not a radio access node or does not require radio connectivity (e.g., a core network node), then the network node may be entirely virtualized.

The functions may be implemented by one or more applications 420 (which may alternatively be called software instances, virtual appliances, network functions, virtual nodes, virtual network functions, etc.) operative to implement steps of some methods described herein. Applications 420 run in virtualization environment 400 which provides hardware 430 comprising processing circuitry 460 and memory 490. Memory 490 contains instructions 495 executable by processing circuitry 460 whereby application 420 is operative to provide any of the relevant features, benefits, and/or functions disclosed herein.

Virtualization environment 400, comprises general-purpose or special-purpose network hardware devices 430 comprising a set of one or more processors or processing circuitry 460, which may be commercial off-the-shelf (COTS) processors, dedicated Application Specific Integrated Circuits (ASICs), or any other type of processing circuitry including digital or analog hardware components or special purpose processors. Each hardware device may comprise memory 490-1 which may be non-persistent memory for temporarily storing instructions 495 or software executed by the processing circuitry 460. Each hardware devices may comprise one or more network interface controllers 470 (NICs), also known as network interface cards, which include physical network interface 480. Each hardware devices may also include non-transitory, persistent, machine readable storage media 490-2 having stored therein software 495 and/or instruction executable by processing circuitry 460. Software 495 may include any type of software including software for instantiating one or more virtualization layers 450 (also referred to as hypervisors), software to execute virtual machines 440 or containers as well as software allowing to execute functions described herein.

Virtual machines 440 or containers, comprise virtual processing, virtual memory, virtual networking or interface and virtual storage, and may be run by a corresponding virtualization layer 450 or hypervisor. Different instances of virtual appliance 420 may be implemented on one or more of virtual machines 440 or containers, and the implementations may be made in different ways.

During operation, processing circuitry 460 executes software 495 to instantiate the hypervisor or virtualization layer 450, which may sometimes be referred to as a virtual machine monitor (VMM). Virtualization layer 450 may present a virtual operating platform that appears like networking hardware to virtual machine 440 or to a container.

As shown in FIG. 4, hardware 430 may be a standalone network node, with generic or specific components. Hardware 430 may comprise antenna 4225 and may implement some functions via virtualization. Alternatively, hardware 430 may be part of a larger cluster of hardware (e.g. such as in a data center or customer premise equipment (CPE)) where many hardware nodes work together and are managed via management and orchestration (MANO) 4100, which, among others, oversees lifecycle management of applications 420.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, a virtual machine 440 or container is a software implementation of a physical machine that runs programs as if they were executing on a physical, non-virtualized machine. Each of virtual machines 440 or container, and that part of the hardware 430 that executes that virtual machine, be it hardware dedicated to that virtual machine and/or hardware shared by that virtual machine with others of the virtual machines 440 or containers, forms a separate virtual network elements (VNE).

Still in the context of NFV, Virtual Network Function (VNF) is responsible for handling specific network functions that run in one or more virtual machines 440 or containers on top of hardware networking infrastructure 430 and corresponds to application 420 in FIG. 4.

One or more radio units 4200 that each include one or more transmitters 4220 and one or more receivers 4210 may be coupled to one or more antennas 4225. Radio units 4200 may communicate directly with hardware nodes 430 via one or more appropriate network interfaces and may be used in combination with the virtual components to provide a virtual node with radio capabilities, such as a radio access node or a base station.

Some signaling can be effected with the use of control system 4230 which may alternatively be used for communication between the hardware nodes 430 and the radio units 4200.

The system 400 or network node 430 comprises processing circuitry 460 and memory 490 and is operable for validating that a configuration of a cloud system meets requirements, using a reduced test suite selected from a test suite, the processing circuitry being operative to:
classify the requirements and service instances realizing the requirements composing the cloud system;
apply test suite reduction rules to the test suite, using the classified requirements and service instances, to obtain the reduced test suite; and
apply the reduced test suite to the cloud system configured with the configuration, thereby validating that the configuration of the cloud system meets the requirements.

The system 400 or network node 430 is further operative to execute any one of the steps described herein.

The non-transitory computer readable media 495 has stored thereon instructions for validating that a configuration of a cloud system meets requirements, using a reduced test suite selected from a test suite, the instructions comprising:
classifying the requirements and service instances realizing the requirements composing the cloud system;
applying test suite reduction rules to the test suite, using the classified requirements and service instances, to obtain the reduced test suite; and
applying the reduced test suite to the cloud system configured with the configuration, thereby validating that the configuration of the cloud system meets the requirements.

The instructions may further comprise instructions to execute any one of the steps described herein.

Modifications will come to mind to one skilled in the art having the benefit of the teachings presented in the foregoing description and the associated drawings. Therefore, it is to be understood that modifications, such as specific forms other than those described above, are intended to be included within the scope of this disclosure. The previous description is merely illustrative and should not be considered restrictive in any way. Although specific terms may be employed herein, they are used in a generic and descriptive sense only and not for purposes of limitation.

The invention claimed is:

1. A method for validating that a configuration of a cloud system meets requirements, using a reduced test suite selected from a test suite, the method comprising:
classifying using a memory and a processing circuitry, requirements and service instances realizing the requirements composing the cloud system;
applying, using the memory and the processing circuitry, test suite reduction rules to the test suite, using the classified requirements and service instances, to obtain the reduced test suite;
applying, using the memory and the processing circuitry, the reduced test suite to the cloud system configured with the configuration, thereby validating that the configuration of the cloud system meets the requirements and causing signaling between hardware nodes and radio units via the memory and the processing circuitry, wherein the step of classifying the service instances further comprises classifying the service instances among: a service instance directly impacted by a change, a service instance indirectly impacted by the change and a service instance not impacted by the change, wherein classifying the service instance is done using an applicability matrix which maps test cases to service instances to which the test cases are applicable and using a requirement-service matrix which maps every requirement to the service instance realizing the requirement; and
removing an applicability link between the service instance and a test case which realizes a requirement if the requirement is directly or indirectly impacted, the requirement is environment dependent, and there is an entry in a history consisting of a test case, a requirement, and a set of configuration parameters identical to the set of configuration parameters that are associated with the service instance and that impacts the requirement.

2. The method of claim 1, wherein the step of classifying the requirements further comprises classifying the requirements among: environment agnostic requirements, environment dependent requirements and composite requirements, wherein classifying the requirements further comprises classifying configuration parameters as environment agnostic or environment dependent configurations parameters and mapping every requirement that is realized by the cloud system to a configuration parameter to which it is related.

3. The method of claim 2, wherein the step of classifying the requirements further comprises classifying the requirements among: directly impacted requirements, indirectly impacted requirements and unimpacted requirements based on the classification of the service instances.

4. The method of claim 1, wherein the step of classifying the requirements further comprises classifying the requirements among: directly impacted requirements, indirectly impacted requirements and unimpacted requirements based on the classification of the service instances.

5. The method of claim 1, wherein the step of applying test suite reduction rules further comprises reducing the applicability matrix by:
removing all the service instances realizing the requirement which are not impacted by the change; and
removing an applicability link between the service instance and a test case which realizes a requirement if the requirement is directly impacted, the requirement is environment agnostic, and there is an entry in the history consisting of a test case, a requirement, and a set of configuration parameters identical to the configuration parameters that are associated with the service instance and that impacts the requirement.

6. The method of claim 5, wherein the step of applying test suite reduction rules further comprises reducing the applicability matrix by:
removing any service instance with no applicable test cases, and which realizes environment agnostic requirements;
removing any service instance if the service instance realizes an environment dependent requirement, the service instance has no applicable test cases and the service instance shares configuration parameters with another service instance that realizes a composite requirement; and
setting back applicability links if the service instance realizes an environment dependent requirement but the service instance has applicable test cases and does not share configuration parameters with another service instance that realizes a composite requirement.

7. The method of claim 1, wherein the step of applying test suite reduction rules further comprises reducing the applicability matrix by:
removing any service instance with no applicable test cases, and which realizes environment agnostic requirements;
removing any service instance if the service instance realizes an environment dependent requirement, the service instance has no applicable test cases and the service instance shares configuration parameters with another service instance that realizes a composite requirement; and setting back applicability links if the service instance realizes an environment dependent requirement but the service instance has applicable test cases and does not share configuration parameters with another service instance that realizes a composite requirement.

8. A system for validating that a configuration of a cloud system meets requirements, using a reduced test suite selected from a test suite comprising processing circuits and a memory, the memory containing instructions executable by the processing circuits whereby the system is operative to perform operations comprising:

classifying, using the memory and the processing circuits, the requirements and service instances realizing the requirements composing the cloud system;

applying, using the memory and the processing circuits, test suite reduction rules to the test suite, using the classified requirements and service instances, to obtain the reduced test suite;

applying, using the memory and the processing circuits, the reduced test suite to the cloud system configured with the configuration, thereby validating that the configuration of the cloud system meets the requirements;

removing an applicability link between the service instance and a test case which realizes a requirement if the requirement is directly or indirectly impacted, the requirement is environment dependent, and there is an entry in a history consisting of a test case, a requirement, and a set of configuration parameters identical to the set of configuration parameters that are associated with the service instance and that impacts the requirement; and causing signaling between hardware nodes and radio units via the memory and the processing circuitry, wherein the step of classifying the service instances further comprises classifying the service instances among: a service instance directly impacted by a change, a service instance indirectly impacted by the change and a service instance not impacted by the change, wherein classifying the service instance is done using an applicability matrix which maps test cases to service instances to which the test cases are applicable and using a requirement-service matrix which maps every requirement to the service instance realizing the requirement.

9. The system of claim 7, further operative to classify the requirements among:

environment agnostic requirements, environment dependent requirements and composite requirements, wherein classifying the requirements further comprises classifying configuration parameters as environment agnostic or environment dependent configurations parameters and mapping every requirement that is realized by the cloud system to a configuration parameter to which it is related.

10. The system of claim 9, further operative to classify the requirements among: directly impacted requirements, indirectly impacted requirements and unimpacted requirements based on the classification of the service instances.

11. The system of claim 8, further operative to classify the service instances among: a service instance directly impacted by a change, a service instance indirectly impacted by the change and a service instance not impacted by the change, wherein classifying the service instance is done using an applicability matrix which maps test cases to service instances to which the test cases are applicable and using a requirement-service matrix which maps every requirement to the service instance realizing the requirement.

12. The system of claim 11, further operative to reduce the applicability matrix by:

removing all the service instances realizing the requirement which are not impacted by the change; and removing an applicability link between the service instance and a test case which realizes a requirement if:
the requirement is directly or indirectly impacted, the requirement is environment dependent, and there is an entry in a history consisting of a test case, a requirement, and a set of configuration parameters identical to the set of configuration parameters that are associated with the service instance and that impacts the requirement; or
the requirement is directly impacted, the requirement is environment agnostic, and there is an entry in the history consisting of test case, a requirement, and a set of configuration parameters identical to the configuration parameters that are associated with the service instance and that impacts the requirement.

13. The system of claim 12, further operative to reduce the applicability matrix by:

removing any service instance with no applicable test cases, and which realizes environment agnostic requirements;

removing any service instance if the service instance realizes an environment dependent requirement, if the service instance has no applicable test cases and the service instance shares configuration parameters with another service instance that realizes a composite requirement; and setting back applicability links if the service instance realizes an environment dependent requirement but the service instance has applicable test cases and does not share configuration parameters with another service instance that realizes a composite requirement.

14. The system of claim 11, further operative to reduce the applicability matrix by:

removing any service instance with no applicable test cases, and which realizes environment agnostic requirements;

removing any service instance if the service instance realizes an environment dependent requirement, if the service instance has no applicable test cases and the service instance shares configuration parameters with another service instance that realizes a composite requirement; and setting back applicability links if the service instance realizes an environment dependent requirement but the service instance has applicable test cases and does not share configuration parameters with another service instance that realizes a composite requirement.

15. The system of claim 8, further operative to classify the requirements among: directly impacted requirements, indirectly impacted requirements and unimpacted requirements based on the classification of the service instances.

16. A non-transitory computer readable media having stored thereon instructions for validating that a configuration of a cloud system meets requirements, using a reduced test suite selected from a test suite, the instructions comprising:

classifying the requirements and service instances realizing the requirements composing the cloud system;

applying test suite reduction rules to the test suite, using the classified requirements and service instances, to obtain the reduced test suite; and applying the reduced test suite to the cloud system configured with the configuration, thereby validating that the configuration of the cloud system meets the requirements and causing signaling between hardware nodes and radio units via a memory and a processing circuitry;

removing an applicability link between the service instance and a test case which realizes a requirement if the requirement is directly or indirectly impacted, the requirement is environment dependent, and there is an entry in a history consisting of a test case, a requirement, and a set of configuration parameters identical to the set of configuration parameters that are associated with the service instance and that impacts the requirement; and causing signaling between hardware nodes and radio units via the memory and the processing circuitry, wherein the step of classifying the service instances further comprises classifying the service instances among: a service instance directly impacted by a change, a service instance indirectly impacted by the change and a service instance not impacted by the change, wherein classifying the service instance is done using an applicability matrix which maps test cases to service instances to which the test cases are applicable and using a requirement-service matrix which maps every requirement to the service instance realizing the requirement.

* * * * *